(12) United States Patent
Haar

(10) Patent No.: US 8,373,294 B2
(45) Date of Patent: Feb. 12, 2013

(54) VERTICAL AXIS WIND TURBINE

(75) Inventor: Jonathan Haar, Cambridge, MA (US)

(73) Assignee: Eastern Wind Power, Cambridge, MA (US)

( * ) Notice: Subject to any disclaimer, the term of this patent is extended or adjusted under 35 U.S.C. 154(b) by 0 days.

(21) Appl. No.: 13/177,242

(22) Filed: Jul. 6, 2011

(65) Prior Publication Data

US 2011/0260455 A1 Oct. 27, 2011

Related U.S. Application Data

(63) Continuation of application No. 12/766,578, filed on Apr. 23, 2010, now Pat. No. 7,988,413.

(51) Int. Cl.
*F03D 7/00* (2006.01)
(52) U.S. Cl. ........................................................ 290/44
(58) Field of Classification Search .................... 290/44, 290/55
See application file for complete search history.

(56) References Cited

U.S. PATENT DOCUMENTS

| 4,115,027 | A | | 9/1978 | Thomas |
| 4,247,252 | A | | 1/1981 | Seki et al. |
| 4,247,253 | A | | 1/1981 | Seki et al. |
| 4,285,636 | A | | 8/1981 | Kato et al. |
| 4,430,044 | A | * | 2/1984 | Liljegren ...................... 416/119 |
| 4,464,579 | A | * | 8/1984 | Schwarz ........................ 290/44 |
| 5,057,696 | A | | 10/1991 | Thomas |
| 5,203,672 | A | | 4/1993 | Wolf |
| 5,332,925 | A | | 7/1994 | Thomas |
| 6,784,566 | B2 | | 8/2004 | Thomas |
| 6,831,374 | B2 | | 12/2004 | Seki |
| 6,864,594 | B2 | | 3/2005 | Seki |
| 6,974,309 | B2 | | 12/2005 | Seki |
| 7,109,599 | B2 | | 9/2006 | Watkins |
| 7,245,039 | B2 | * | 7/2007 | DuHamel ...................... 290/44 |
| 7,352,076 | B1 | | 4/2008 | Gabrys |
| 7,425,776 | B2 | | 9/2008 | Ketcham |
| 7,462,950 | B2 | | 12/2008 | Hu |
| 7,484,363 | B2 | | 2/2009 | Reidy et al. |
| 7,582,982 | B1 | | 9/2009 | Deal |
| 8,013,464 | B2 | * | 9/2011 | Stern et al. ...................... 290/55 |
| 2002/0105190 | A1 | | 8/2002 | Thomas |
| 2004/0041405 | A1 | | 3/2004 | Seki |
| 2004/0170501 | A1 | | 9/2004 | Seki |
| 2004/0195838 | A1 | | 10/2004 | Tomas |
| 2005/0029900 | A1 | | 2/2005 | Hiramatsu |

(Continued)

FOREIGN PATENT DOCUMENTS

| WO | 9213192 | 8/1992 |
| WO | 02/10589 | 2/2002 |

(Continued)

OTHER PUBLICATIONS

Small Wind Certification Council, Small Wind Turbine Certification Policy, Clifton Park, NY, May 2010, pp. 1-27.

(Continued)

*Primary Examiner* — Joseph Waks
(74) *Attorney, Agent, or Firm* — Hovey Williams LLP

(57) ABSTRACT

A vertical axis wind turbine including a generator, a central shaft in rotatable communication with the generator and positioned along a central axis of the vertical-axis wind turbine, a plurality of blades, and a power management subsystem operable to induce a forward current in the generator when the measured wind speed is above a minimum speed required for the blades to rotate but below the wind speed required to overcome a static friction exerted on the central shaft and the blades.

7 Claims, 11 Drawing Sheets

U.S. PATENT DOCUMENTS

| | | | |
|---|---|---|---|
| 2005/0212300 A1* | 9/2005 | Kimura et al. | 290/55 |
| 2007/0177970 A1* | 8/2007 | Yokoi | 415/4.2 |
| 2008/0159873 A1 | 7/2008 | Tran | |
| 2008/0191487 A1 | 8/2008 | Morgan et al. | |
| 2008/0256795 A1 | 10/2008 | Edwards | |
| 2008/0273978 A1 | 11/2008 | Watkins | |
| 2008/0309090 A1* | 12/2008 | Stern et al. | 290/55 |
| 2009/0097981 A1 | 4/2009 | Gabrys | |
| 2009/0167030 A1 | 7/2009 | Watkins | |
| 2009/0304507 A1 | 12/2009 | Dehlsen | |
| 2010/0013233 A1 | 1/2010 | Buhtz | |
| 2010/0050500 A1 | 3/2010 | Pieraccini | |
| 2010/0060001 A1* | 3/2010 | Gabrys | 290/44 |
| 2010/0133829 A1* | 6/2010 | Bertenyi | 290/44 |
| 2010/0194251 A1 | 8/2010 | Sikes | |
| 2010/0230965 A1 | 9/2010 | Pitre et al. | |
| 2010/0230972 A1 | 9/2010 | Haar | |
| 2010/0307285 A1 | 12/2010 | Underwood | |
| 2011/0006543 A1 | 1/2011 | Hu | |
| 2011/0037264 A1 | 2/2011 | Roddier et al. | |
| 2011/0133474 A1 | 6/2011 | Haar | |
| 2011/0229312 A1 | 9/2011 | Frank | |
| 2011/0291413 A1* | 12/2011 | Wamble et al. | 290/44 |
| 2012/0000742 A1 | 1/2012 | Sekella | |
| 2012/0014792 A1* | 1/2012 | Smith et al. | 416/23 |
| 2012/0020792 A1 | 1/2012 | Frank | |

FOREIGN PATENT DOCUMENTS

| | | |
|---|---|---|
| WO | 03064852 | 8/2003 |
| WO | 2005010355 | 2/2005 |
| WO | 2005085633 | 9/2005 |
| WO | 2006119922 | 11/2006 |
| WO | 2007012195 | 2/2007 |
| WO | 2007021992 | 2/2007 |
| WO | 2007/121563 | 11/2007 |
| WO | 2008077199 | 7/2008 |
| WO | 2008100580 | 8/2008 |
| WO | 2008119994 | 10/2008 |
| WO | 2008141763 | 11/2008 |
| WO | 2008141813 | 11/2008 |
| WO | 2009075853 | 6/2009 |
| WO | 2009075872 | 6/2009 |

OTHER PUBLICATIONS

International Standard, Wind turbines—Part 2: Design requirements for small wind turbines, IEC, Geneva, Switzerland, Second Edition, Reference No. IEC 61400-2:2006(E), pp. 1-181.

Abbott et al., National Advisory Committee for Aeronautics, Report No. 824, Summary of Airfoil Data, 1945, pp. 1-265.

Sheldahl et al., "Aerodynamic Characteristics of Seven Symmetrical Airfoil Sections Through 180-Degree Angle of Attack for Use in Aerodynamic Analysis of Vertical Axis Wind Turbines," Sandia National Laboratories Energy Report, Mar. 1981, pp. 1-120.

Strickland, "The Darrieus Turbine: A Performance Prediction Model Using Multiple Streamtubes," Sandia Laboratories Energy Report, Oct. 1975, pp. 1-36.

Cochran et al., "Integrating Wind Energy into the Design of Tall Buildings—A Case Study of the Houston Discovery Tower: Harvesting Wind Power from Tall Buildings," 2008, pp. 1-11.

International Search Report and Written Opinion dated Dec. 20, 2011 in corresponding PCT/US2011/031702 filed on Apr. 8, 2011.

Office Action dated Feb. 6, 2012 in corresponding U.S. Appl. No. 13/077,495, filed Mar. 31, 2011.

Office Action dated Aug. 11, 2011 in corresponding U.S. Appl. No. 13/077,547, filed Mar. 31, 2011.

Office Action dated Nov. 28, 2011 in corresponding U.S. Appl. No. 13/077,547, filed Mar. 31, 2011.

Office Action dated May 8, 2012 in corresponding U.S. Appl. No. 13/077,547, filed Mar. 31, 2011.

* cited by examiner

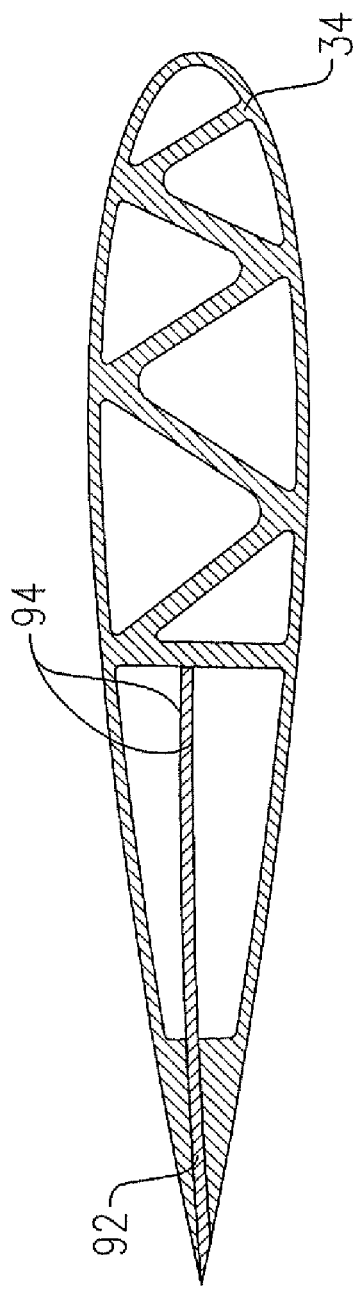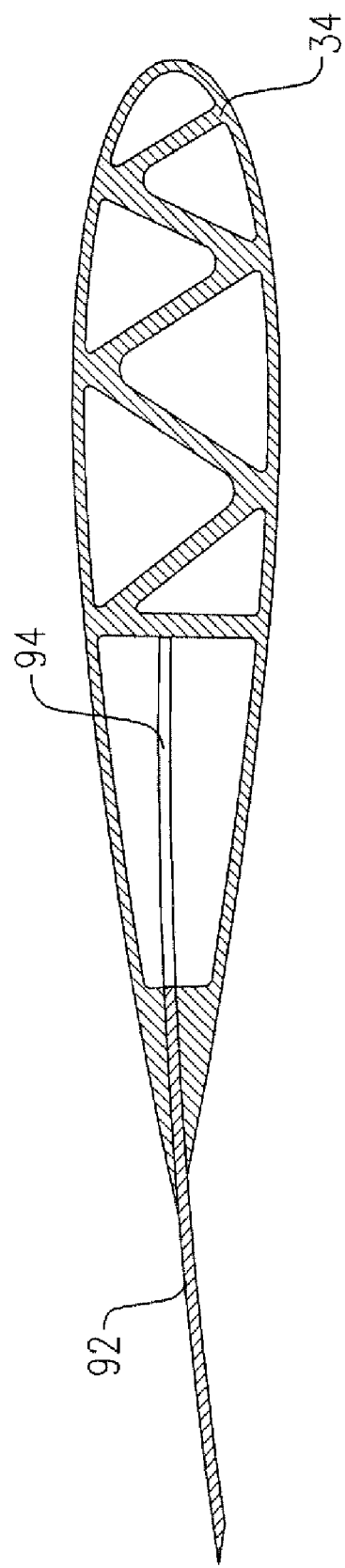

VERTICAL AXIS WIND TURBINE

CROSS-REFERENCE TO RELATED APPLICATIONS

The present application is a continuation of U.S. patent application Ser. No. 12/766,578, filed Apr. 23, 2010, which is incorporated by reference herein in its entirety, and which issued on Aug. 1, 2011, as U.S. Pat. No. 7,988,413.

FIELD OF THE INVENTION

The present invention relates to wind turbines. More particularly, the invention relates to high-performance vertical axis wind turbines.

BACKGROUND

Wind energy is rapidly emerging as one of the most cost-effective forms of renewable energy with an ever-increasing installed capacity around the world. Wind turbines are generally categorized as Horizontal-Axis Wind Turbines (HAWT) or Vertical-Axis Wind Turbines (VAWT). HAWTs feature a high blade tip velocity ratio, relatively high power generation efficiency, and low start-up torque. In contrast, VAWTs, possess several inherent advantages over HAWTs. For example, VAWTs do not have to be yaw-adjusted to follow the changing direction of prevailing wind, and consequently handle gusts more efficiently. Being omni-directional, VAWTs can handle turbulent winds found in most urban areas more effectively than HAWTs. VAWTs are also much quieter in operation, are lower in vibration, are bird-friendly, and do not create optical flickering. However, a disadvantage of most VAWT configurations is that they require a relatively high start-up torque and are inherently less efficient. Additionally, the vertical orientation places strain on the bearings supporting the central shaft, thus shortening the duty cycle of VAWTs.

SUMMARY

The present invention solves the above-described problems and provides a distinct advance in the art of vertical axis wind turbines. More particularly, the present invention provides a vertical axis wind turbine (VAWT) that incorporates several unique features that enable the VAWT to function over a wider range of wind speeds than previously possible. Additionally, embodiments of the present invention incorporate features to extend the duty cycle of the VAWT and enable the VAWT to start-up in lower-speed winds than previously possible.

One embodiment of the VAWT broadly includes a support structure, a generator assembly, a rotor assembly, and an electronics system. The support structure supports the rotor assembly and may include support cables and a bearing assembly. The generator assembly generates electrical energy from the rotation of the central shaft and may include a plurality of generators that may be enabled independently and are protected from water by a generator housing. The rotor assembly includes a central shaft, struts, and airfoil-shaped blades, and generates torque from the rotation of the blades under aerodynamic force. The blades may include an adjustable blade extension element to extend a chord length of each blade to aid in the self-starting of the VAWT. The electronics system monitors and controls various aspects of the operation and efficiency of the VAWT and its environment.

In another embodiment, the blades include one or more blade ailerons and a blade aileron adjustment subsystem. The blade ailerons extend from the trailing edge of the blade to change the overall camber of the blade and, consequently, changing the apparent angle of attack to improve the torque generated from each blade. The blade aileron adjustment subsystem controls the position of the blade ailerons to increase the torque generated by the blades and to reduce drag.

This summary is provided to introduce a selection of concepts in a simplified form that are further described below in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein:

FIG. 4 is a view through a blade showing a blade extension element in a retracted position;

FIG. 5 is a view through a blade showing a blade extension element in a extended position;

Figure 1:
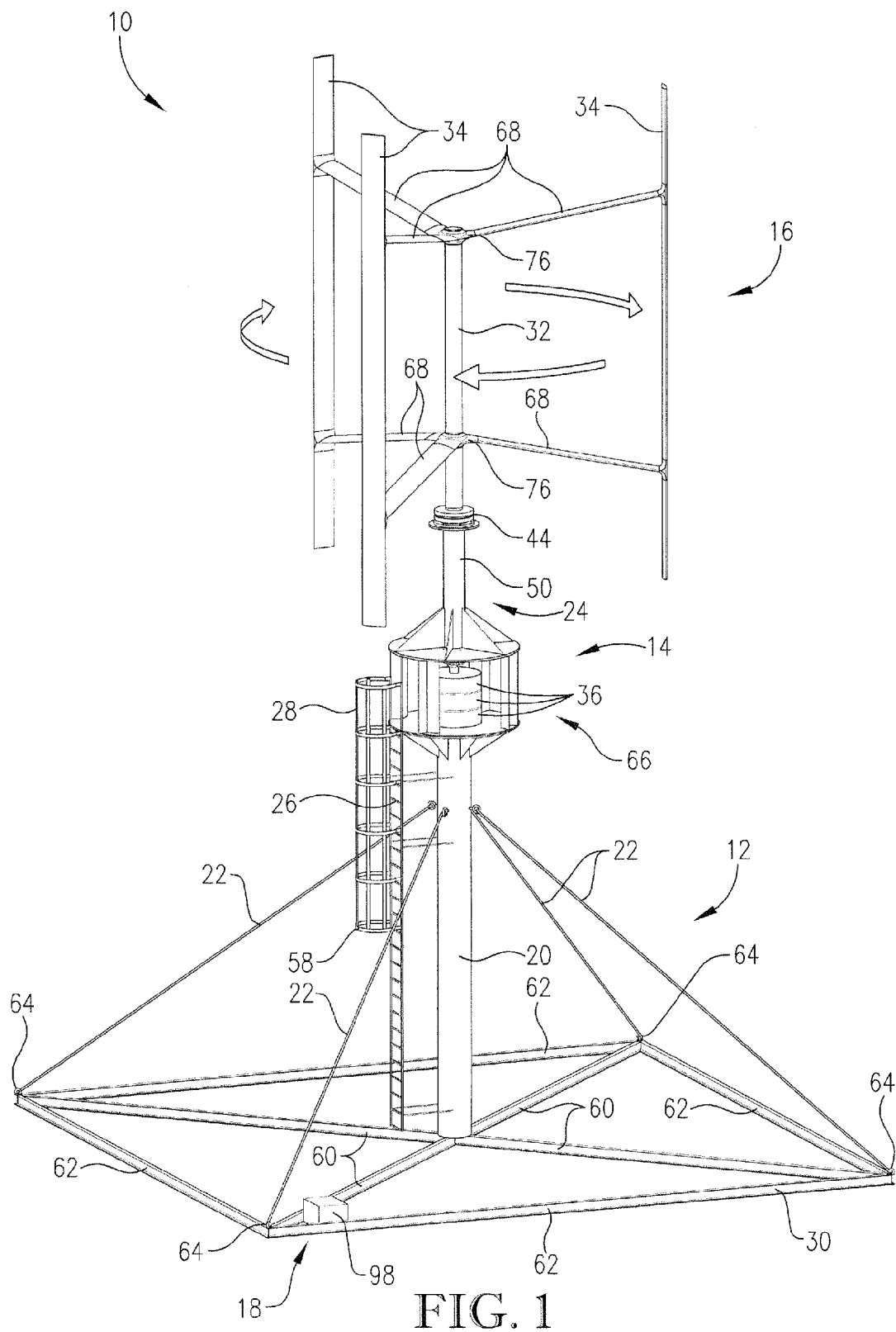
FIG. 1 is an isometric view illustrating components of a Vertical Axis Wind Turbine (VAWT) constructed in accordance with an embodiment of the present invention.

The drawing figures do not limit the present invention to the specific embodiments disclosed and described herein. The drawings are not necessarily to scale, emphasis instead being placed upon clearly illustrating the principles of the technology.

DETAILED DESCRIPTION

The following detailed description of various embodiments of the present technology references the accompanying drawings which illustrate specific embodiments in which the technology can be practiced. The embodiments are intended to describe aspects of the technology in sufficient detail to enable those skilled in the art to practice them. Other embodiments can be utilized and changes can be made without departing from the scope of the technology. The following detailed description is, therefore, not to be taken in a limiting sense. The scope of the present technology is defined only by the appended claims, along with the full scope of equivalents to which such claims are entitled.

Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

An omni-directional vertical wind turbine electric generator system has been disclosed in U.S. Pat. No. 7,109,599 to Watkins. The contents of this patent in its entirety are incorporated herein by reference.

Turning now to the drawing figures, and particularly FIG. 1, a vertical-axis wind turbine (VAWT) 10 constructed in accordance with an embodiment of the invention is illustrated. The VAWT 10 broadly includes a support structure 12, a generator assembly 14, a rotor assembly 16, and an electronics system 18.

In this embodiment, the support structure 12 supports and orients the other components of the VAWT 10 in a generally vertical position and includes a vertically-oriented support column 20, a plurality of support cables 22, a bearing assembly 24, a ladder 26, a safety cage 28, and a frame assembly 30.

The support column 20 is an elongated tube and is provided for supporting the rotor assembly 16. In various embodiments, the support column may have a circular, oval, square, hexagonal, or airfoil-shaped cross-section and may be constructed from steel, aluminum, fiberglass, carbon-fiber, a composite metal-fiberglass, or the like. In embodiments where the support column is oval or airfoil-shaped, the major axis of the oval or airfoil may be aligned to face the predominant wind direction to reduce wind forces on the support structure 12. The support column 20 may be any height and, in certain embodiments, the support column 20 height may be 7 meters (m) or 3 m. In other embodiments of the VAWT 10, the support column may be omitted entirely. In high-wind, open-area, or roof-top environments, a short support column 20 may be preferred. In some embodiments, the support column 20 may include several pieces that are assembled to form a whole.

The support cables 22 support the support column 20 in a generally vertically-oriented position and extend radially from a portion of the support column 20 to anchor positions to provide additional lateral support to the VAWT 10. The support column 20 may include twisted steel cable, solid steel tubing, or the like. The support cables 22 may further include an adjustable tensioning system, such as a turnbuckle, so the tension of the support cables 22 may be adjusted to provide sufficient tension to support the VAWT 10 without damaging the support cables 22. In some embodiments, the support cables 22 are attached at or near an upper end of the support column 20. In other embodiments, the support cables 22 may be attached near a mid-point of the support column 20. In yet other embodiments, some support cables 22 may be attached at a first vertical location along the support column 20 and other support cables 22 may be attached at a second vertical location. Any number of support cables 22 may be used in any configuration. Some embodiments use four support cables 22 spaced 90 degrees apart around a vertical axis. In other embodiments, no support cables may be used. In yet other embodiments, six support cables 22 may be used and three may attach near the top of the support column 20 and three may attach near a mid-point of the support column 20.

Figure 2:
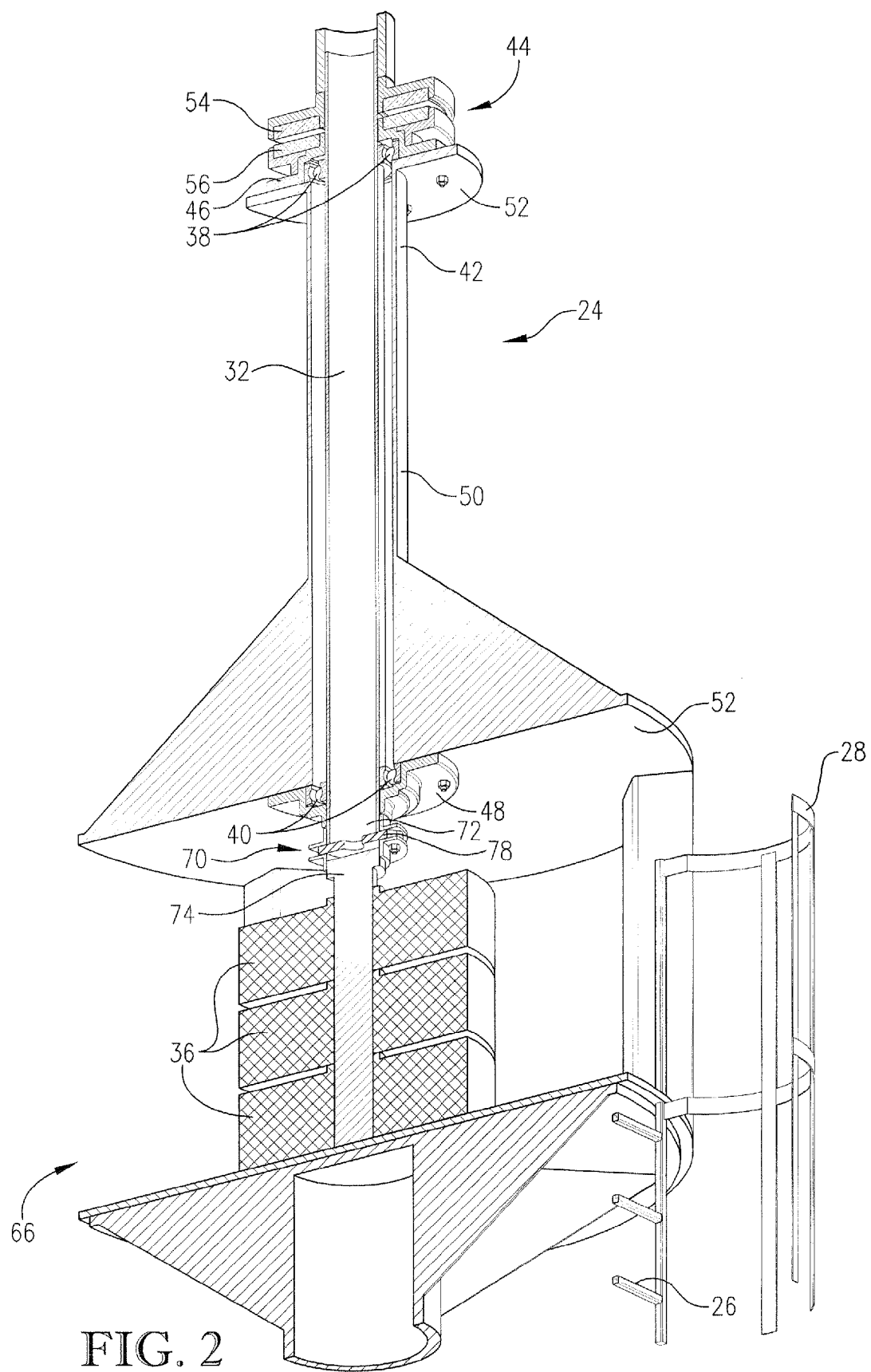
FIG. 2 is a cutaway view of an embodiment of a generator assembly and a bearing assembly of a VAWT constructed in accordance with an embodiment of the present invention.

Turning now to FIGS. 1 and 2, the bearing assembly 24 supports the weight of the rotor assembly 16, provides for rotation of the central shaft 32, and removes transmission of lateral torque generated by sinusoidal power transmitted to the central shaft 32 by rotation of the blades 34, relieving side-loading or overloading the generator 36 bearings. The bearing assembly 24 includes an upper bearing 38, a lower bearing 40, a bearing housing 42, and a magnet assembly 44. In various embodiments, the upper bearing 38 and lower bearing 40 may be roller bearings, ball bearings, thrust bearings, bushings, or the like. In some embodiments, the upper bearing 38 and lower bearing 40 are preloaded to allow a vertical displacement of the central shaft of a few millimeters (mm) along a vertical axis. Some embodiments use a preload of 2, 3, 4 or 5 millimeters (mm).

The bearing housing 42 supports upper bearing 38 and lower bearing 40 within the upper bearing case 46 and lower bearing case 48, respectively, and includes a central tube 50 with radially-extending flanges 52 on opposing, spaced-apart ends of the central tube 50. Disposed on the radially-extending flanges 52 are axially-aligned bearings 38, 40 that are each disposed within a bearing case 46, 48 so that the bearings 38, 40 and the central tube 50 define an axial passageway for the central shaft 32 through the bearing housing 42.

The magnet assembly 44 provides vertical force to, at least partially, support the weight of the rotor assembly 16 and includes an upper magnet 54 and a lower magnet 56. In this embodiment, the upper magnet 54 and lower magnet 56 are planar discs that surround the central shaft 32. The upper magnet 54 is attached to the central shaft 32 at a first vertical position. The lower magnet 56 is attached to an upper portion of the bearing assembly 24. The upper magnet 54 and lower magnet 56 may be electro-magnets, neodymium magnets, or a combination thereof, or the like. In some embodiments, the upper and lower magnets 54, 56 have opposite polarity and, thus, create a repulsive upward force on the upper magnet 54 that can, at least partially, lift weight of the rotor assembly 16. In other embodiments, the upper and lower magnets 54, 56 have the same polarity and, thus, act as a brake for the rotor assembly 16. In these embodiments, a friction-generating surface, clutch, or friction plate may be included on a bottom surface of the upper magnet 54 and on an upper surface of the lower magnet 56 to increase the braking force. In some embodiments, one or both of the upper magnet 54 and the lower magnet 56 are electro-magnets that and are operable to change polarity. Thus, in this embodiment, the magnet assembly 44 is operable to selectively lift the rotor assembly 16 or brake the rotor assembly 16. In various embodiments, the upper magnet 54, the lower magnet 56, or both, further comprise a plurality of magnets arranged at a radius that function as a single magnet. In yet other embodiments, the lower magnet 56 comprises a plurality of magnets of that may include electro-magnets and neodymium alternately arranged at a radius where the electro-magnets are individually operable to create a magnetic force of selectable polarity. Additionally, the upper magnet 54 may comprise a plurality neodymium magnets arranged at a radius and one of the plurality of neodymium magnets may have an opposite polarity from the others. Thus, in this embodiment, electro-magnets of the lower magnet 56 may be caused to change polarity in sequence and thereby induce rotation in the central shaft while supporting the weight of the rotor assembly 16.

The ladder 26 provides access to the various portions of the VAWT 10, including the generator assembly 14, and may be located on an exterior portion of the support column 20 or may be disposed within an interior portion of the support column 20. In embodiments where the ladder 26 is located on an exterior portion of the support column 20, a safety cage 28 with a locking door 58 at a lower end can be supplied to protect technicians who may climb the ladder 26 and to prevent unauthorized access to the VAWT 10. In some embodiments, a wire ascender system may be used in addition to the ladder 26 to provide additional security for a technician climbing the ladder 26.

In this embodiment, the support structure 12 further includes a frame assembly 30 including a plurality of radially-extending legs 60 and connecting members 62 at distal ends of the legs 60 for stabilizing and supporting the VAWT 10. The frame assembly 30 can be fabricated from steel or aluminum I-beams and may be a single piece or multiple pieces joined to form a unitary whole. The frame assembly 30 may include attachment points 64 for connecting the support cables 22 to the frame assembly 30.

The generator assembly 14 generates electrical energy from the rotation of the central shaft 32 and may include one or more generators 36 and a generator housing 66. The generators 36 may include a single generator or a series of generators each attached to the central shaft 32. In some embodiments, each generator 36 may selectively be in an open-circuit state so that each generator 36 in the open circuit state does not create an electric field and, thus, does not exert magnetic counter-torque on the central shaft 32. Thus, in light wind conditions, the rotation of the central shaft 32 causes each generator 36 to rotate, but only one generator 36 may provide power to the electronics system 18 and, in heavy wind conditions, all the generators 36 may provide power to the electronics system 18. In some embodiments, generators with different ratings may be used so that a single high-rating generator 36 may be selectively active in high-wind conditions and a single lower-rating generator 36 may be active in low-wind conditions. Thus, the VAWT 10 can be specifically tailored to the expected wind conditions at a location, can allow easier startup in low-wind conditions, and can further adjust to changing wind conditions.

As shown best in FIG. 2, the generator housing 66 surrounds, protects, and prevents water from entering each generator 36. In this embodiment, the generator housing 66 is generally tubular with a conical top portion and the generators 36 disposed within an inner cavity of the generator housing 66. The generator housing 66 may be fabricated of fiberglass, steel, aluminum, polymer, or a composite thereof. In some embodiments, the generator housing 66 contains openings or vents to provide airflow for cooling the generators 36, and to provide for access for maintenance and repair. In other embodiments, the generator housing 66 may be omitted altogether.

The rotor assembly generally includes a central shaft 32, a plurality of struts 68, and a plurality of blades 34.

The central shaft 32 is an elongated shaft that extends vertically along a central axis of the VAWT 10 and transmits torque from the struts 68 to the generators 36. The central shaft 32 includes a coupling member 70 joining an upper segment 72 and a lower segment 74 and a hub assembly 76. In this embodiment, the coupling member 70 utilizes an elastomeric inner portion 78 to reduce transmission of vibration and shock between the upper segment 72 and the lower segment 74 caused by abrupt acceleration and deceleration of the rotor assembly 16. The central shaft 32 may be fabricated from steel, aluminum, fiberglass, polymer, a composite thereof, or the like. In some embodiments, the central shaft 32 may terminate within the generator housing 66. In some other embodiments, the central shaft 32 includes a plurality of segments that are joined to form the central shaft 32.

Figure 3:
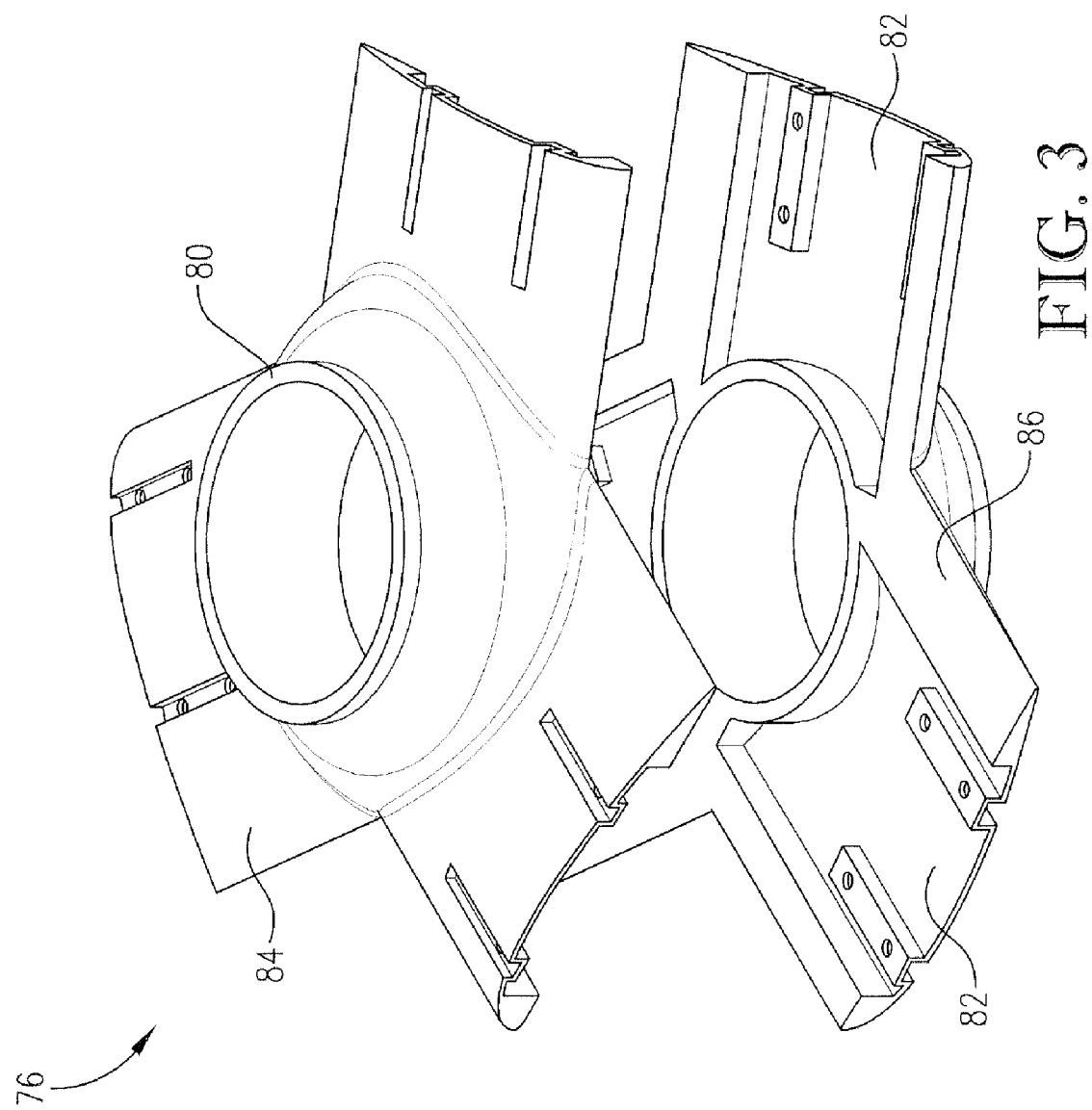
FIG. 3 is disassembled view of a hub constructed in accordance with an embodiment of the present invention.

Turning to FIGS. 1 and 3, the hub assembly 76 fixably attaches the struts 68 to the central shaft 32. Each hub assembly 76 generally includes a central collar 80 and a plurality of strut receiving portions 82. The hub assembly 76 may further include an upper hub portion 84 and a lower hub portion 86 that are joined to form a complete hub assembly 76 and attached to the central shaft 32 so the hub assembly 76 rotates with the central shaft 32. In some embodiments, the upper hub portion 84 and the lower hub portion 86 are substantially identical. In various embodiments, the hub assembly 76 is attached to the central shaft 32 with pins, keys, bolts, epoxies, adhesives, or the like. Some embodiments may include a plurality of hub assemblies 76 for attaching the struts 68 to the central shaft 32.

As shown best in FIG. 1, the struts 68 are thin elongated members that extend radially from the central shaft 32 outward to the blades 34 for supporting the blades 34 and transmitting torque to the central shaft 32. The struts 68 may be elongated rods, I-beams, or other structure capable of supporting the blades 34 radially. Various embodiments may include any number of struts 68 and, in some embodiments, one two or three struts 68 are used to attach a single blade 34 to the central shaft 32. In other embodiments, a single strut 68 may attach one two or three blades 34 to the central shaft 32. In various embodiments, the length of the struts may be between 2 meters to 12 meters. The struts may include an inner fastening element 88 and an outer fastening element 90. The inner fastening element 88 may be operable to removably attach the strut 68 to the hub assembly 76 and the outer fastening element 90 may be operable to removably attach the strut 68 to the blade 34.

The blades 34 are elongated airfoils for creating torque from movement of surrounding air and providing the torque to the central shaft 32 through the struts 68. The blades 34 may be fabricated from molded polymer or molded fiberglass. In some embodiments, the blades 34 may utilize composite "H", "W", or "I" spars as stiffeners. In some other embodiments, each blade 34 comprises an outer skin or shell with a hollow or void inner portion. In other embodiments, each blade 34 comprises an outer skin or shell with a reinforcing material, such as polystyrene foam, wood, dense glass composite, fiberglass, carbon fiber, aluminum, or the like, contained therein. In some embodiments, the outer skin or shell comprises an aluminum skin riveted to aluminum ribs, "H", "W", or "I" sections. In yet other embodiments, a cloth skin is used to cover the reinforcing structure. Each blade 34 may additionally include one or more spars running along the span of the blade 34.

The shape of the blade 34 may be symmetric, asymmetric, flat bottom, or undercambered. In some embodiments, each blade 34 is a symmetric airfoil having substantially the NACA0018 or NACA 0025 airfoil shape as set forth by the National Advisory Committee for Aeronautics (NACA). In various embodiments, a chord length of each blade 34 may be between 0.2 meters and 1.5 meters. In some embodiments, a span or height of each blade 34 may between 3 meters to 30 meters. The blades 34 may be oriented in a generally vertical direction perpendicular to the struts 68 and may have a zero-degree pitch angle or, in other embodiments, the blades 34 have a pitch angle between −5 to 5 degrees.

In the embodiment shown in FIG. 5, the blades 34 include an adjustable blade extension element 92 to extend a chord length of the blade 34 to aid in the self-starting of the VAWT 10. The blade extension element 92 is a thin extended member that adjustably extends from an interior pocket 94 of the blade 34 through an aft surface to ambient. In some embodiments, the extension element 92 may be positioned with a linear actuator, a spring, or the like. At startup in low-wind conditions, the blade extension element 92 is extended from the blade 34 and then retracted after the blade 34 reaches a defined speed, revolutions per minute, or the like. The blade extension element 92 may extend along a portion of the blade 34, or it may extend along the entire span of the blade 34 and it may be flat or curved along an axis generally parallel to the span of the blade 34.

Figure 6:
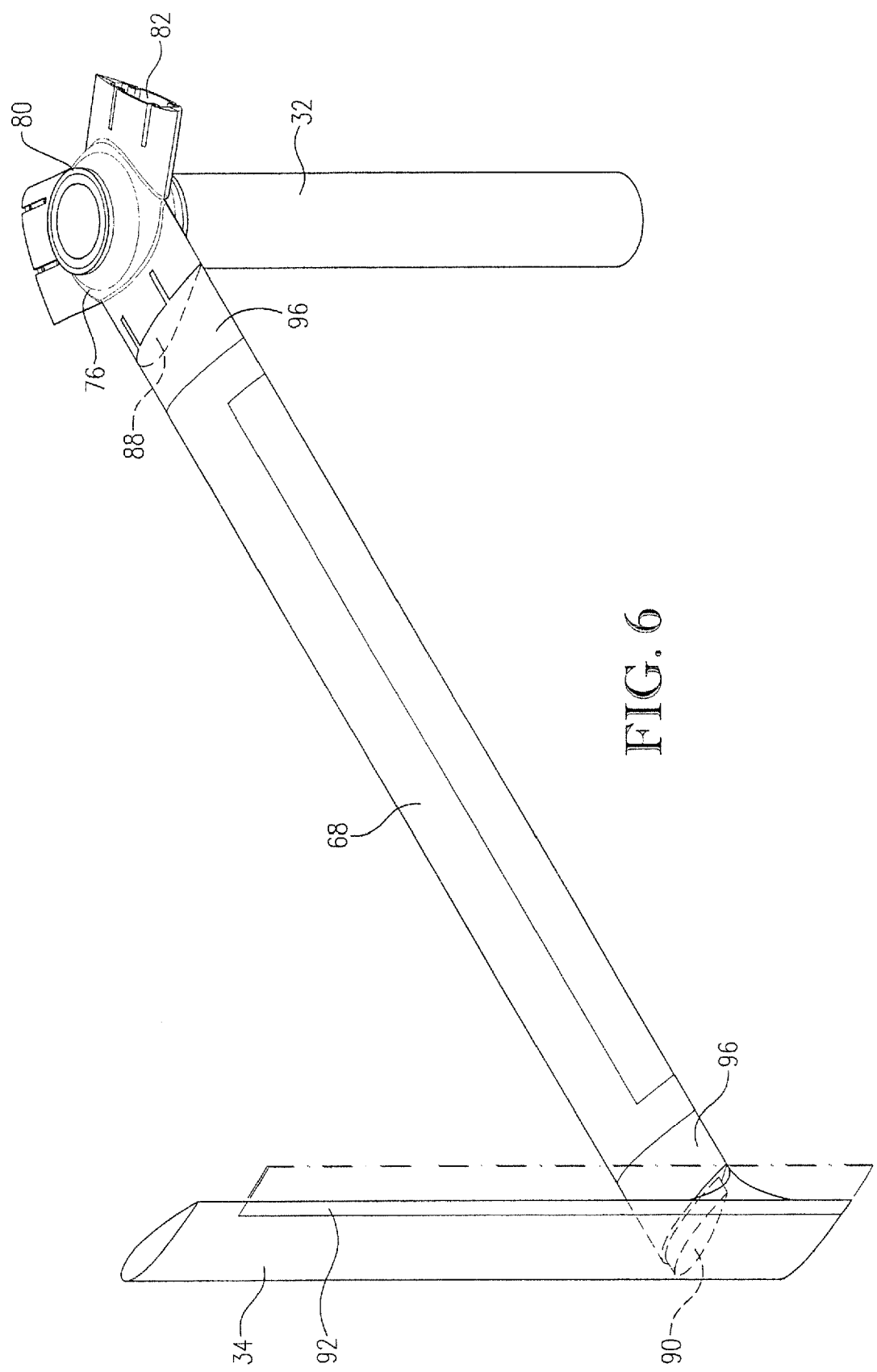
FIG. 6 is an isometric view showing a central shaft, a hub, a strut, and a blade.

In the embodiment shown in FIG. 6, the struts 68 may be airfoil-shaped to reduce drag and, in some embodiments, at least partially support the weight of the rotor assembly 16. The airfoil may be constructed of any material and manner suitable for the blades 34, as described above. The airfoil shape may be symmetric, asymmetric, flat bottom, or undercambered. In one embodiment, the airfoil is substantially the NACA63(420)-422 airfoil.

In various embodiments, the airfoil-shaped struts 68 can have angles of attack between about 0 degrees and about 12 degrees. In certain embodiments, the struts 68 are mounted with about a 5 degree angle of attack. To achieve an angle of attack of the struts 68, the struts 68 can include a transition region 96 at one or both ends of the strut. In the transition region, the chord of the strut 68 twists or rotates such that the desired angle of attack is achieved along a major portion of the strut 68. For example, in the transition region, the leading edge side of the strut chord can continuously rotate up by about 5 degrees, so that when the inner fastening element 88 attaches to the hub assembly 76, the leading edge of the strut is angled upward with approximately a +5 degree angle of attack. In certain embodiments, the lifting force provided by the struts 68 reduces vertical pressure exerted by the central shaft 32 on bearings 38, 40 supporting the central shaft 32 and generator 36 bearings, extending the duty cycle.

Figure 7:
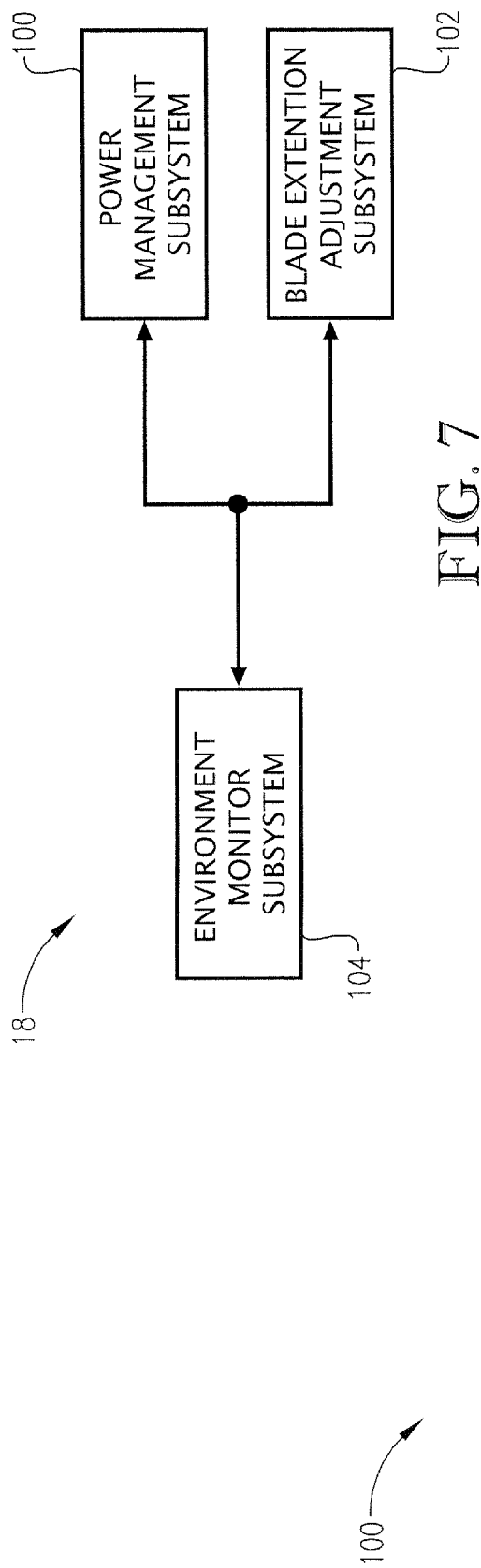
FIG. 7 is a block diagram illustrating the electronics system of an embodiment of the present invention.

Turning to FIG. 7, the VAWT 10 may be equipped with an electronics system 18 to monitor and control various aspects of the operation and efficiency of the VAWT 10 and its environment. In various embodiments, the electronics system 18 may be contained within a housing 98, the support column 20, or the like. The electronics system 18 may include a plurality of subsystems including a power management subsystem 100, a blade extension adjustment subsystem 102, or a monitoring subsystem 104. Each subsystem 100, 102, 104 may function independently or they may be integrated to utilize components or data from the other subsystems.

Figure 8:
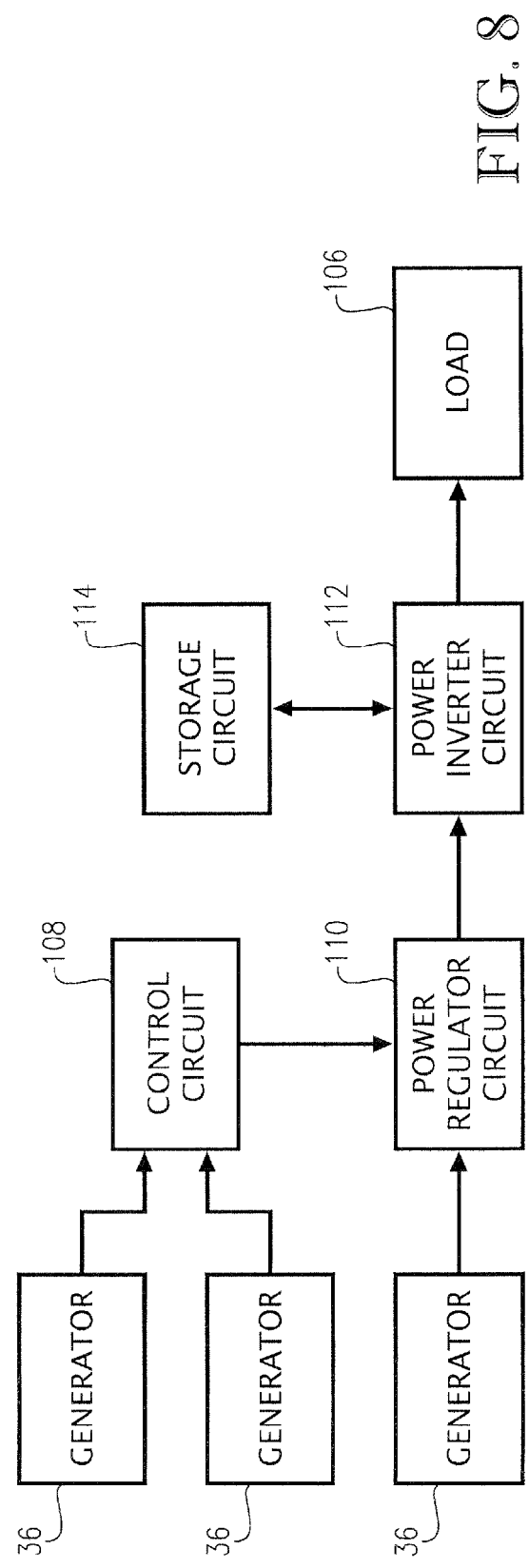
FIG. 8 is a block diagram showing a power management subsystem.

Turning to FIG. 8, The power management subsystem 100 captures, filters, and transmits power from each generator 36 to a load 106, for example the power grid, for use. The power management subsystem 100 broadly includes the generators 36, described above with reference to FIGS. 1 and 2, a control circuit 108, a power regulation circuit 110, a regenerative drive circuit 112, and an optional storage circuit 114.

The control circuit 108 determines whether the power management subsystem 100 should begin transmitting power and includes an electronic processor and memory. In some embodiments, the control circuit 108 may determine that power generation should begin at a specified hour of the day when, historically, wind speeds exceed a certain minimum. In other embodiments, the control circuit 108 may utilize data from other subsystems, such as the monitoring subsystem 104, to begin power generation when certain predefined criteria are satisfied. When the control circuit 108 determines power generation should stop, or if the rotor assembly 16 is rotating too quickly, the control circuit 108 may apply a current in a backward direction from the current generated by the generator 36 thereby inducing the generator 36 to act as an electric motor and slow, stop, or reverse the movement of the rotor assembly 16. In this way, the control circuit 108 can make each generator 36 act as a brake to slow or stop the rotor assembly 16.

The power regulation circuit 110 receives a variable voltage from each generator 36, possibly through the control circuit 108, and provides a generally constant DC voltage to the regenerative drive circuit 112. The power regulation circuit may include rectifiers, low-pass filters, or the like.

The regenerative drive circuit 112 converts the DC voltage into an AC voltage useable by the load 106 and may be operable to recapture power in various conditions, such as when braking the rotor assembly 16. The regenerative drive circuit 112 may include any circuit for converting DC to AC, an inverter, a regenerative AC drive, or the like. Some embodiments include a storage circuit 114 to store electrical energy to be supplied by the power management subsystem 100 or for delivery of stored energy independent of the power management subsystem 100. The storage circuit 114 may include flywheel storage, hydrogen generation and storage, air compressor storage, batteries, capacitors, or the like. In some embodiments, the storage circuit 114 may even store energy by cooling water or other liquid or by producing ice that may be provided to cool buildings, water, or other the like. In yet other embodiments, the storage circuit 114 may activate a pump to move water, or other liquid, to an elevated holding tank.

Figure 9:
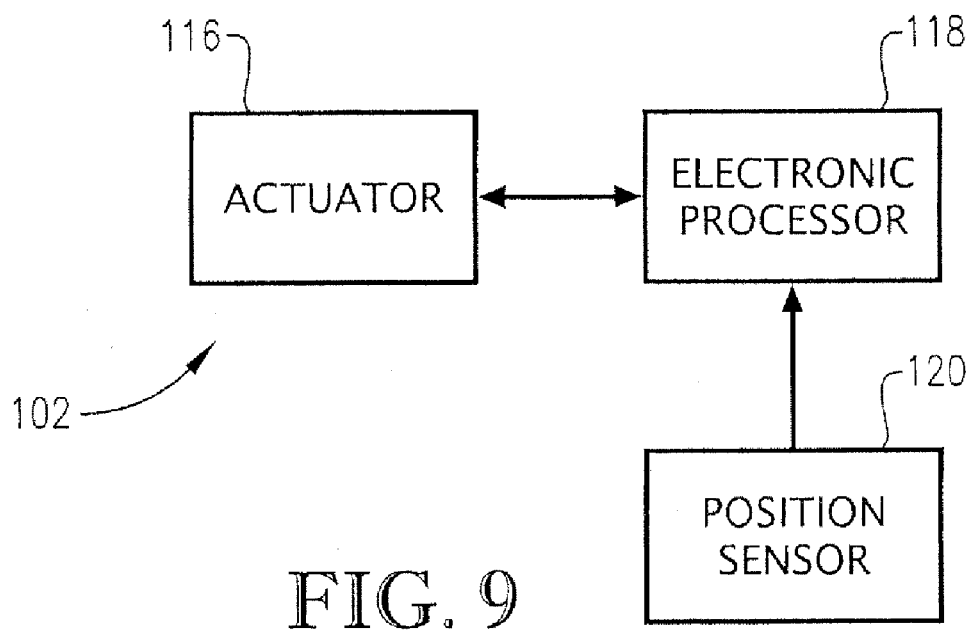
FIG. 9 is a block diagram showing a blade extension adjustment subsystem.

Turning to FIG. 9, the blade extension adjustment subsystem 102 adjusts the blade extension elements 92 on the blades 34 and includes an actuator 116 and an electronic processor 118. In some embodiments, the blade extension adjustment subsystem 102 additionally includes a position sensor 120. The actuator 116 extends or retracts the blade extension element 92 within the interior pocket 94 of the blade 34 through an aft surface of the blade 34 to ambient. The actuator 116 may be a linear actuator, electric motor, linear motor, or the like, and may further utilize gears, pulleys, springs, gravity, magnets, a combination thereof, or the like, to position the blade extension element 92.

The electronic processor 118 directs the actuator 116 to adjust the position of the blade extension element 92 and may include any electronic device capable of processing stored instructions. In various embodiments, the electronic processor 118 may be a microprocessor, a field-programmable gate array (FPGA), an application-specific integrated circuit (ASIC), a microcontroller, or the like.

The position sensor 120 determines the current position of the blade extension element 92 and may be any electronic device capable of so signaling. In various embodiments, the position sensor 120 may be an electronic proximity sensor, a potentiometer, an optical sensor, or the like. The position sensor 120 may even be a pair of switches where one switch is operable to close when the blade extension element is fully extended and another is operable to close when the blade extension element 92 is fully retracted.

Figure 10:
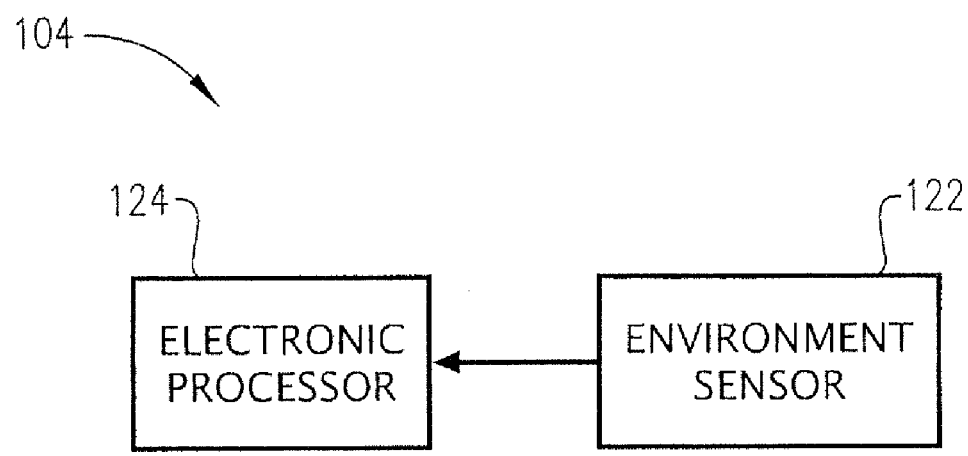
FIG. 10 is a block diagram showing an environmental monitoring subsystem.

Turning now to FIG. 10, monitoring subsystem 104 measures various aspects of the physical environment or of the status and operation of the VAWT 10 and provides at least one value to the electronics system 18. The environmental monitoring subsystem 104 includes at least one sensor 122 and an electronic processor 124.

The sensor 122 measures physical values relating to the environment of the VAWT 10, or of the VAWT 10 itself, and electronically communicates the physical value to the electronic processor 124. In various embodiments, the sensor 122 may be an anemometer, a wind vane, a sonic wind sensor, a hygrometer, a photoresistor, a photodetector, a temperature sensor, an rpm sensor, voltage sensor, torque meter, or the like.

The electronic processor 124 receives the physical values from the sensor 122 and may include any electronic device capable of processing stored instructions. In various embodiments, the electronic processor 124 may be a microprocessor, a field-programmable gate array (FPGA), an application-specific integrated circuit (ASIC), a microcontroller, or the like. In various embodiments, the electronic processor 124 is operable to determine the speed and direction of the current wind, forecast upcoming weather changes, determine day/night cycles, determine the rotational speed of the rotor assembly 16, determine the output of each generator 36, and the like. In some embodiments, the electronic processor 124 may generate a signal when the sensor 122 indicates a value above, below, within, or outside a value, series of values, or range of predefined or computed values.

In some embodiments, the monitoring subsystem 104 is operable to determine a tip speed ratio (TSR) from the speed of the rotor assembly 16 and a wind speed and the power management subsystem 100 may induce a backward current in a generator 36 if the TSR is above a predefined value, if the speed of the rotor assembly is above a nominal speed, or to maintain a pre-determined optimal torque curve. In other embodiments, the monitoring subsystem 104 is operable to determine a wind speed and, if the wind speed is within a predefined range, the power management subsystem 100 may induce a forward current in a generator 36 to rotate the rotor assembly 16. In some embodiments, the power management subsystem 100 induces a forward current in the generator 36 when the measured wind speed is above a minimum speed required for the rotor assembly 16 to rotate, but below the wind speed required to overcome the static friction exerted on the central shaft 32 and rotor assembly 16. In yet other embodiments, the monitoring subsystem 104 is operable to determine the ambient temperature of the VAWT 10 and is operable to enable a deicing circuit operable to warm a leading edge or a body of each of the blades 34 when the ambient temperature is below a predefined threshold. In various embodiments, other combinations of monitored conditions may trigger various other functions of the electronics system 18.

Figure 11:
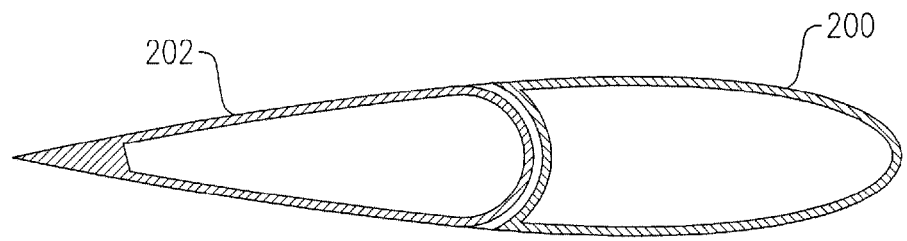
FIG. 11 is a view through a blade showing a blade aileron in an alternate embodiment of the present invention.
Figure 12:
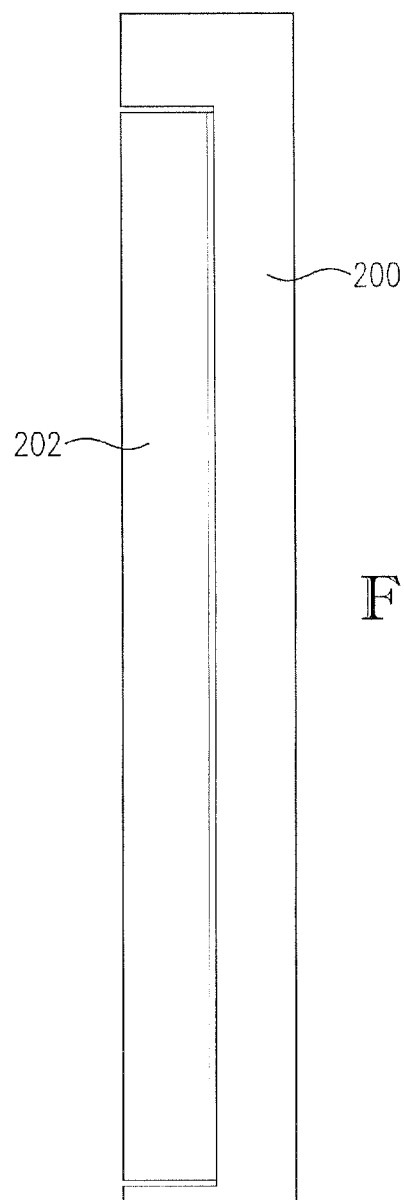
FIG. 12 is an alternate view of the blade of FIG. 12 illustrating a blade aileron.
Figure 13:
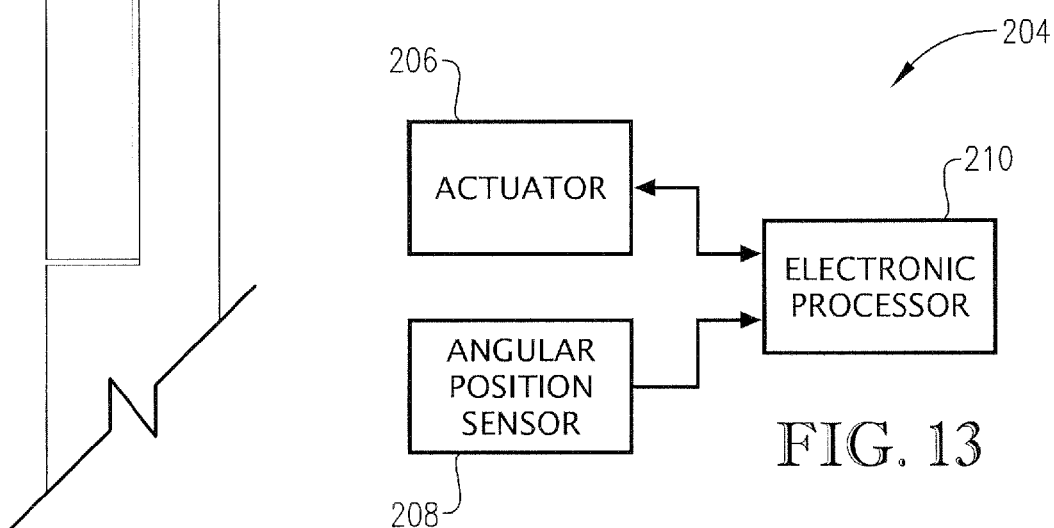
FIG. 13 is a block diagram showing a blade aileron adjustment subsystem.

FIGS. 11-14. illustrate a blade that may be used with an embodiment of a VAWT, such as VAWT 10 of FIG. 1. Turning to FIGS. 11 and 12, each blade 200 may include one or more blade ailerons 202 and a blade aileron adjustment subsystem 204.

The blade ailerons 202 are disposed along a trailing edge of each blade 200 to change the overall camber of the blade 200 and, consequently, changing the apparent angle of attack to improve the torque generated from each blade 200. The blade aileron 202 may run along substantially the whole span of the blade 200 or it may include only part of the span.

Additionally, this embodiment further includes a blade aileron adjustment subsystem 204 that controls the deflection of each blade aileron 202 on each blade 200 of the rotor assembly (not shown) and includes an actuator 206, angular position sensor 208, and an electronic processor 210.

The actuator 206 positions the blade aileron 202 to a specified deflection and may include a servomotor, a stepper motor, a brushless DC motor, a linear actuator, or the like. Additionally, in some embodiments, the actuator 206 may further include a position sensor, such as a rotary encoder, position sensor, or the like to determine the position of the blade aileron 202. In one embodiment, a servomotor may be used to position the blade aileron in varying positions as the rotor assembly, such as rotor assembly 16 of FIG. 1, sweeps through a 360-degree arc. In other embodiments, a linear actuator may be used to move the blade aileron 202 and a rotary encoder is used to measure the deflection of the blade aileron 202.

The angular position sensor 208 measures the position of the rotor assembly relative to the support structure, such as support structure 12 of FIG. 1. The angular position sensor 208 may comprise a rotary encoder, potentiometer, or the like. In some embodiments, the angular position sensor 208 may even comprise a series of magnets and a sensor to determine an angular displacement. In some embodiments, the angular position sensor 208 is aligned to a predetermined direction, such as true north, so the position of the rotor assembly relative to the ground is known.

The electronic processor 210 directs the actuator 206 to adjust the position of the blade aileron 202 and may include any electronic device capable of processing stored instructions. In various embodiments, the electronic processor 210 may be a microprocessor, a field-programmable gate array (FPGA), an application-specific integrated circuit (ASIC), a microcontroller, or the like. The electronic processor 210 may further include volatile or non-volatile memory to store instructions, data, or the like.

Figure 14:
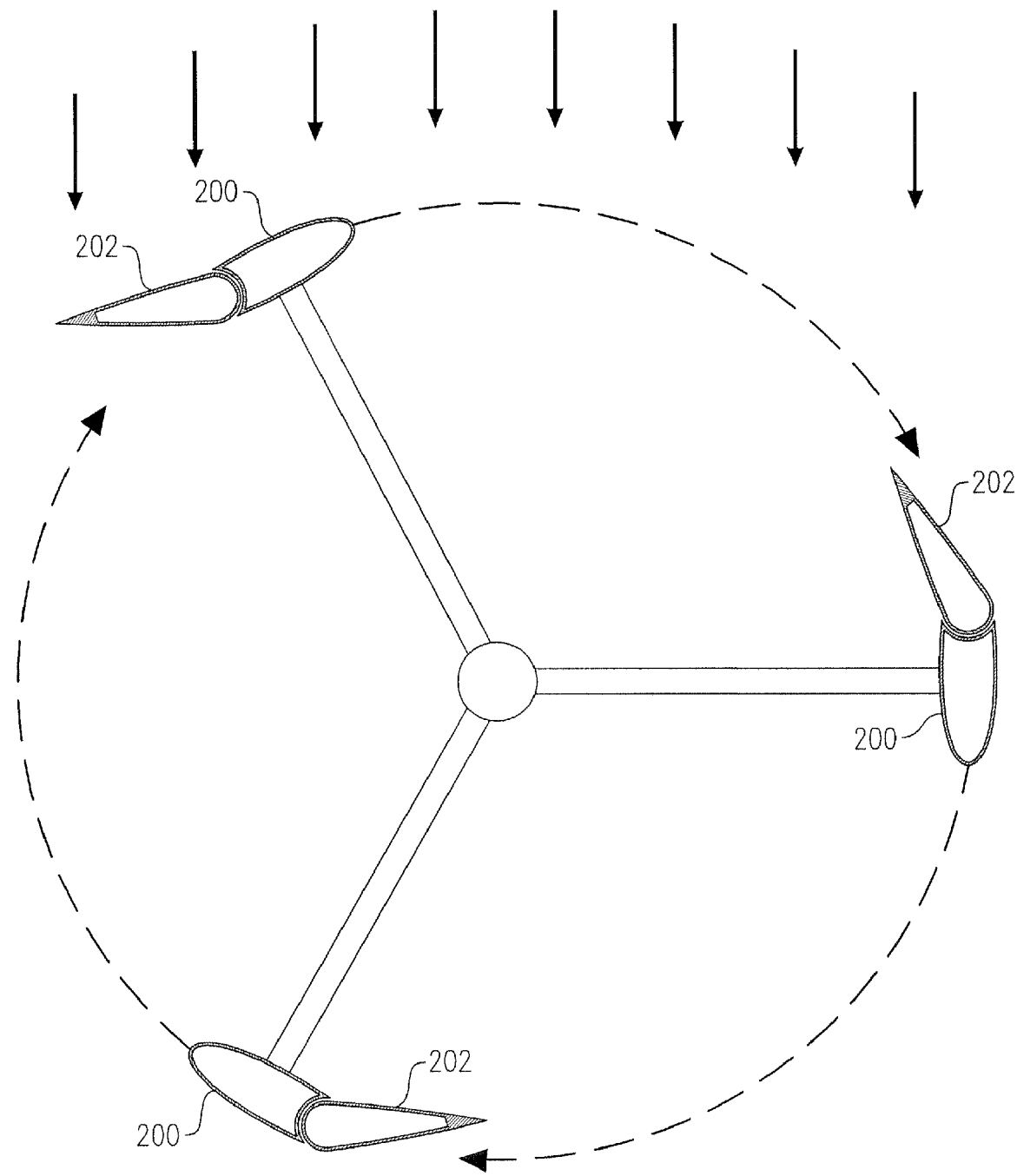
FIG. 14 is a top view of a rotor assembly illustrating adjustments of blade ailerons relative to a prevailing wind.

Turning to FIG. 14, in some embodiments, the blade aileron 202 may be manually adjusted to a particular deflection and, in other embodiments, the blade 200 may include an actuator operable to position the blade aileron 202 at a various deflections as a rotor assembly rotates through a 360 degree arc. For example, the blade aileron 202 may be adjusted to a first deflection when the leading edge faces the predominant wind, to a second deflection when the leading edge is at a 3 o'clock position relative to the predominant wind, to a third deflection when the leading edge faces away from the predominant wind, and a fourth deflection when the leading edge is at a 9 o'clock position relative to the predominant wind, and so on.

Figure 15:
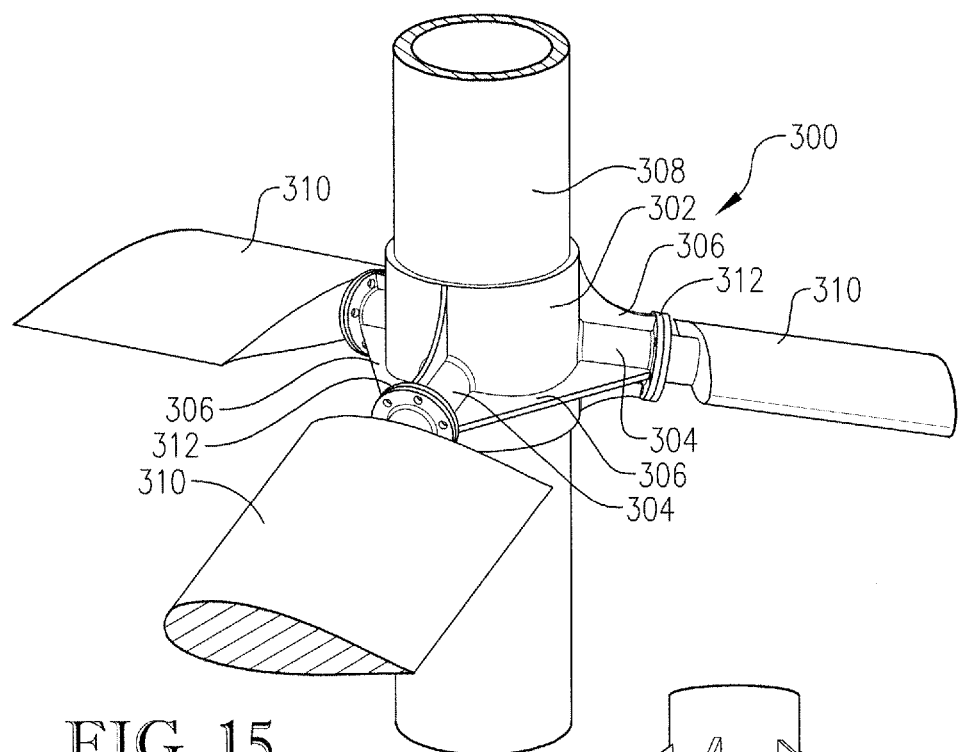
FIG. 15 is an isometric view of an embodiment of a hub that may be used with embodiments of the present invention.

FIG. 15, illustrates another embodiment of a hub 300 that may be used with a VAWT, such as VAWT 10 of FIGS. 1-12. The hub 300 includes a central collar 302, strut receiving portions 304, and reinforcing members 306.

The central collar 302 is a tubular member for attaching to the central shaft 308. The central collar 302 may be metal, composite material, or the like and may be fixably disposed around the central shaft 308 with welds, adhesive, bolts, pins, or the like. In some embodiments, the central collar 302 is metal and is attached to the central shaft 308 with welds. In other embodiments, the central collar 302 may be incorporated into the central shaft 308 as a unitary whole. In other embodiments, the central collar 302 may be omitted and the central shaft 308 functions as the central collar 302.

The strut receiving portions 304 are radially extending tubular members for positioning and supporting the struts 310 and may further include a radially extending circular flange 312. Each strut receiving portion 304 is attached to the central collar 302 at a proximal end and attached to the struts 310 at a distal end of each strut receiving portion 304. Each strut receiving portion 304 may include the flange 312 at its distal end to further secure and support the strut 310 thereon. The strut receiving portions 304 may be metal, composite material, or the like, and may be attached to the central collar 302 with adhesive, welds, brackets, bolts, pins, or the like. In some embodiments, each strut receiving portion 304 may be a hollow tube for matingly receiving a portion of the strut 310 within a hollow central portion (not shown) of the strut receiving portion 304.

The reinforcing members 306 are generally planar members for supporting and strengthening the strut receiving portions 304. The reinforcing members 306 may be metal, composite, or the like and may be arranged in nearly any configuration. The reinforcing members 306 may be attached to the central collar 302 and strut receivers 304 with welds, adhesives, brackets, bolts, pins, or the like. In the embodiment shown in FIG. 15, the reinforcing members 306 are arranged to support the strut receivers 304 along predominantly horizontal and vertical axes.

Figure 16:
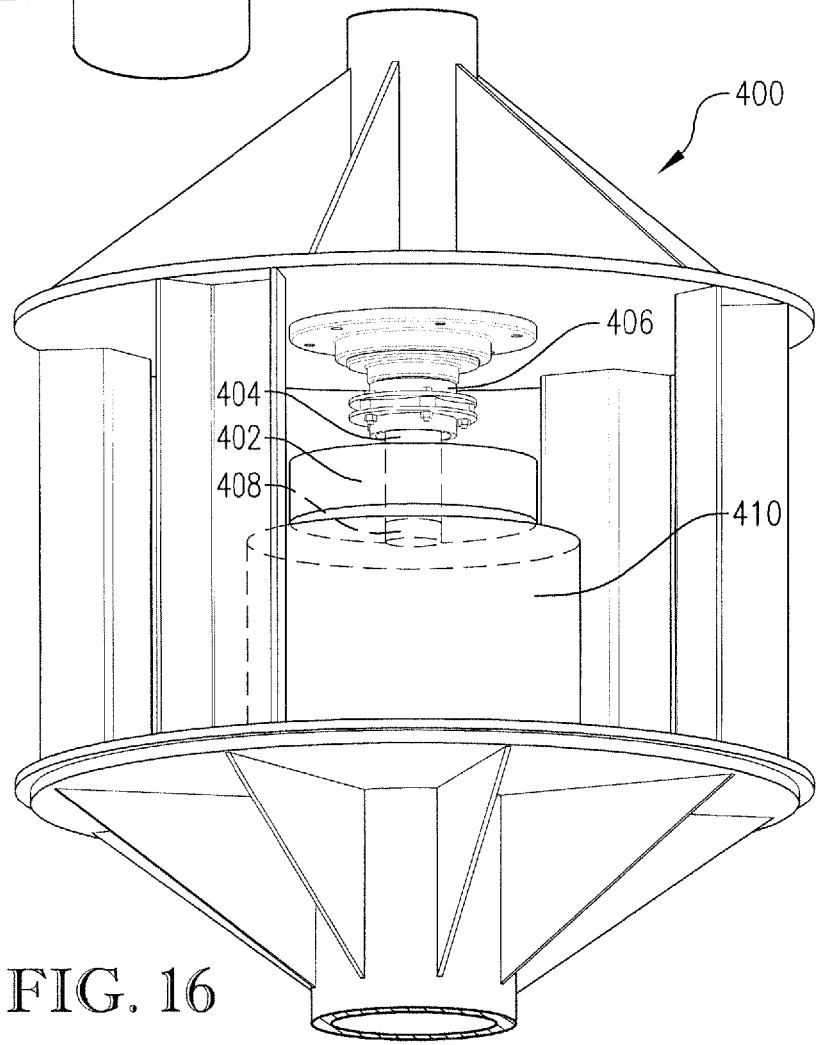
FIG. 16 is an isometric view of an embodiment of a generator assembly and a gear box that may be used with embodiments of the present invention.

Turning to FIG. 16, another embodiment of a generator assembly 400 that may be used with a VAWT, such as VAWT 10 of FIGS. 1-12. This embodiment is substantially similar to the generator assembly 14 of FIG. 2, except as indicated.

In this embodiment, the generator assembly 400 further includes a gear box 402 in communication with a lower segment 404 of the central shaft 406 with an output shaft 408 of the gear box 402 in communication with each generator 410 for increasing or decreasing the rotational speed of the output shaft 408, relative to the central shaft 406. The gear box 402 may be operable to use one or a multitude of different gear ratios. In some embodiments, the gear box 402 may decrease the rotational speed of the output shaft 408 if the central shaft 406 is rotating faster than optimal for peak power production for a generator 410. In other embodiments, the gear box 402 may increase the rotational speed of the output shaft 408 if the central shaft 406 is rotating slower than optimal for peak power production for the generator 410. In yet other embodiments, the gear box 402 uses a single gear ratio that may increase or decrease the rotational speed of the output shaft 408 relative to the central shaft 406.

Figure 17:
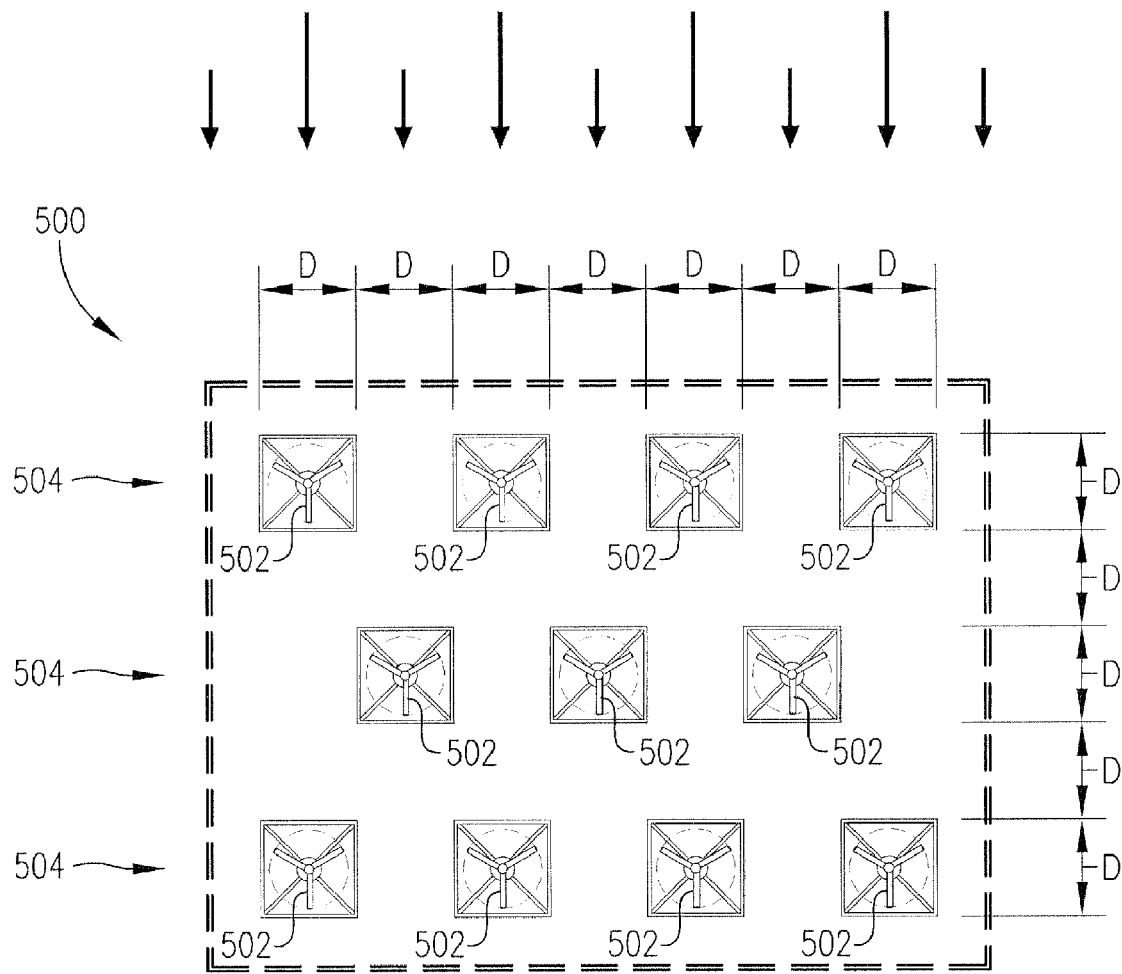
FIG. 17 illustrates a wind generation system with VAWTs constructed in accordance with embodiments of the present invention.

Turning to FIG. 17, in some embodiments, a wind generation system 500 may be constructed from a plurality of VAWTs 502. In this embodiment, the plurality of VAWTs 502 are grouped in sets that are arranged in rows 504 that are perpendicular to a predominant wind direction and separated from each adjacent row 504 by a distance of approximately one rotor diameter D. Additionally, adjacent VAWTs 502 in each row 504 are spaced-apart by a distance of approximately one rotor diameter D. Additionally, in this embodiment, the VAWTs 502 of each row 504 are staggered to be positioned within the gap between with VAWTs 502 of the upwind row 504. Thus, the wind generation system 500 maintains a dense arrangement of VAWTs 502 while enabling each VAWT 502 to function at top efficiency by avoiding a wake downwind from each VAWT 502.

The above described embodiments of a VAWT provide numerous advantages over prior art wind turbines. For example, the generators may be selectively activated to tailor the resistance and the output of the VAWT to the current conditions. In low wind conditions, a single low-output generator may be active to reduce resistance on the rotor assembly. In high wind conditions, several low-output generators, or a single high-output generator, may be active to increase the electrical generating capacity of the VAWT.

Additionally, retractable blade extensions may be employed to allow for startup of the VAWT in low-wind conditions. Blades of a wind turbine designed for a particular range of wind speeds may not be sufficient to rotate the rotor assembly in light winds. Thus, retractable blade extensions allow the blades to generate torque over a wider range of wind speeds.

Using an airfoil with a positive angle of attack or magnets on the struts to relieve load on the bearing assembly extends the duty cycle of the VAWT. Relieving the downward pressure from the rotor assembly on the bearings reduces wear on the bearings extending their life.

Also, the performance of the VAWT may be improved by adjusting the angle of attack of the blades at various positions. Dynamically adjustable ailerons enable increased torque and decreased drag at various angles of deflection of the rotor assembly and, thus, improve the efficiency of the VAWT.

Positioning a plurality of VAWTs in a dense configuration to create a power generation system, as described herein, enables maximum power generation without decreasing the efficiency of the VAWTs, as compared to the typical VAWT spacing of ten rotor diameters or more. Such configurations are useful for placement of VAWTs on building rooftops or in other locations where dense configurations are required.

Although the invention has been described with reference to the preferred embodiment illustrated in the attached drawing figures, it is noted that equivalents may be employed and substitutions made herein without departing from the scope of the invention as recited in the claims.

What is claimed is:

1. A vertical-axis wind turbine comprising:
   a generator;
   a central shaft in rotatable communication with the generator and disposed along a central axis of the vertical-axis wind turbine;
   a plurality of blades; and
   a power management subsystem operable to induce a forward current in the generator when the measured wind speed is above a minimum speed required for the blades to rotate, but below the wind speed required to overcome a static friction exerted on the central shaft and the blades, wherein the power management subsystem is programmed to maintain a plurality of different tip speed ratios of blade to wind speed rotation, and wherein the power management subsystem is able to step from a first mode with a more efficient standard operating ratio to a second mode with a less efficient standard operating ratio in a wind condition that would require shutdown in the first mode, thereby allowing continued operation at a higher wind speed and expanding the total wind speed range of the vertical axis wind turbine for power production.

2. The vertical axis wind turbine of claim 1, wherein the generator is attached to the central shaft.

3. The vertical axis wind turbine of claim 1, wherein the power management subsystem is further operable to induce a backward current in the generator if a tip speed ratio is above a predefined value.

4. The vertical axis wind turbine of claim 1, wherein the power management subsystem is further operable to induce a backward current in the generator if the speed of the blades is above a nominal speed.

5. The vertical axis wind turbine of claim 1, wherein the power management subsystem is further operable to induce a backward current in the generator to maintain a pre-determined optimal torque curve.

6. The vertical axis wind turbine of claim 1, wherein the power management subsystem further includes a control circuit for making the generator act as a brake to slow or stop the shaft, the struts, and the blades.

7. The vertical axis wind turbine of claim 1, wherein the power management subsystem further includes a regenerative drive circuit for converting DC voltage into AC voltage and for recapturing electrical power when the control circuit is acting as a brake.

* * * * *